US008687114B2

(12) United States Patent
Bennett

(10) Patent No.: US 8,687,114 B2
(45) Date of Patent: *Apr. 1, 2014

(54) VIDEO QUALITY ADAPTATION BASED UPON SCENERY

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 13/312,522

(22) Filed: Dec. 6, 2011

(65) Prior Publication Data
US 2012/0075525 A1    Mar. 29, 2012

Related U.S. Application Data

(63) Continuation of application No. 12/237,186, filed on Sep. 24, 2008, now Pat. No. 8,085,855.

(51) Int. Cl.
*H04N 7/01* (2006.01)
*H04N 11/20* (2006.01)

(52) U.S. Cl.
USPC ........... 348/441; 348/446; 348/448; 348/456; 348/458; 348/412.1; 348/426.1; 348/95; 348/51; 348/700; 375/240.26; 375/240.01; 345/428; 345/698

(58) Field of Classification Search
USPC .......... 348/441, 448, 458, 700, 95, 51, 412.1, 348/426.1, 456, 446; 375/240.26, 240.01; 345/428, 698
See application file for complete search history.

(56) References Cited

U.S. PATENT DOCUMENTS

2005/0062891 A1* 3/2005 Tang et al. .................... 348/607
2007/0288651 A1* 12/2007 Nassor et al. ................. 709/231

* cited by examiner

*Primary Examiner* — Jefferey Harold
*Assistant Examiner* — Mustafizur Rahman
(74) *Attorney, Agent, or Firm* — Garlick & Markison; Bruce E. Garlick

(57) ABSTRACT

Operating on video frames includes determining a frame set backdrop of a set of video frames that is a characterization of the relative difference in content of the set of video frames. Decreasing video quality of the set of video frames when the frame set backdrop is relatively higher indicating relatively greater content difference among video frames of the set of video frames and increasing/leaving quality of the set of video frames when the frame set backdrop is relatively lower indicating relatively lesser content difference among video frames of the set of video frames. Alteration of video quality of the set of video frames includes altering a frame rate, altering a pixel resolution, and/or altering color resolution of the set of video frames and/or altering a ratio of independent frames to predictive frames of the set of frames.

20 Claims, 11 Drawing Sheets

VIDEO QUALITY ADAPTATION BASED UPON SCENERY

CROSS-REFERENCE TO PRIORITY APPLICATION

This application is a continuation of U.S. Utility application Ser. No. 12/237,186 filed Sep. 24, 2008, now issued as U.S. Pat. No. 8,085,855, which is incorporated herein by reference in its entirety.

BACKGROUND

1. Technical Field

The present invention relates generally to the packetized transmission of video; and, more particularly, to the processing of such video by a source or intermediate device.

2. Related Art

Until recently, Internet Service Providers (ISPs) could only provide access to the Internet at a slow data rate so that even simple web page surfing was tediously slow. The rapid evolution of software and hardware technology and substantial investment in Internet infrastructure has resulted in end user connectivity communication rate increases over the years. Today, ISPs provide broadband access to users at bit rates that easily exceed one Mega bit per second (Mbps). As a result, ISPs and content providers are now able to provide and support services that go far beyond providing mere access to web pages. These new services include access to streaming video, downloading movies, streaming audio, downloading audio, and/or downloading composite content for later presentation.

Content providers and ISPs now deliver video/audio content, which may be Internet Protocol Tele-Vision "IPTV" to recipient devices such as personal computers, televisions, personal video players, and other personal and pocket video devices. In addition, content providers and ISPs provide other video/audio content, e.g., Internet television that is live/stored video/audio that may be viewed on a computer screen using an Internet browser or video/audio playing software.

Typically, IPTV and Internet television transmissions supported by the Internet infrastructure are processed by compression/encoding and packetizing of digital audio and video content at a source device before delivery to a recipient device. The recipient device de-packetizes, decompresses/decodes received content before storing or displaying the content on the recipient device or a communicatively coupled display device. Program sources may include commercial television and radio broadcast studios, locally stored commercial and non-commercial music and movie programs, etc., all of which are delivered either on pay per program basis or periodic rental basis.

In general, the received IPTV signal arrives as multiplexed Internet Protocol (IP) packetized audio, video, and data. Recipient devices often use broadband modems or IPTV Set Top Box (IPTV STB) of a service provider, e.g., ISP, as a part of IPTV service to receive the IP packets although some recipient devices have all functionally supported via hardware/software, eliminating a need for a separate IPTV STB. The recipient device converts the audio/video data carried by the IP packets into a format that is compatible with the recipient/display device, e.g., television, personal video player, personal video recorder, etc.

Compression/encoding technologies available today include MPEG (for compressing digital video signals), JPEG (for compressing digital pictures), and MP3 (for compressing digital audio signals). Video compression processes may include spatial compression followed by temporal compression. Temporal compression may include the generation of spatially compressed independent frames followed by the generation of a set of spatially compressed reference frames that carry difference video information relative to an independent frame and/or some of the preceding reference frames and/or other previously or subsequently received independent frames.

While audio, video, and data compression/encoding provide savings in Internet channel resources (such as bandwidth/data throughput) the compression often results in the introduction of errors over a brief period of time. For example, errors in receipt of spatial compressed independent frames may persist for display information for in many subsequent frames created from the independent frame and reference and/or re-reference frames. Audio, video, and data decompression/decoding require the recipient device to support high capacity processing and buffering. When video is displayed upon a battery powered device such as a cell phone or other such device, the benefits of data compression/encoding may be outweighed by a reduction in battery life. In addition, typical video quality that may be provided by a content provider/ISP is often of High Definition Television (HDTV) quality. Thus, large amounts of Internet channel resources are used for transmission even though the recipient device/display device may be incapable of presenting the content in High Definition.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
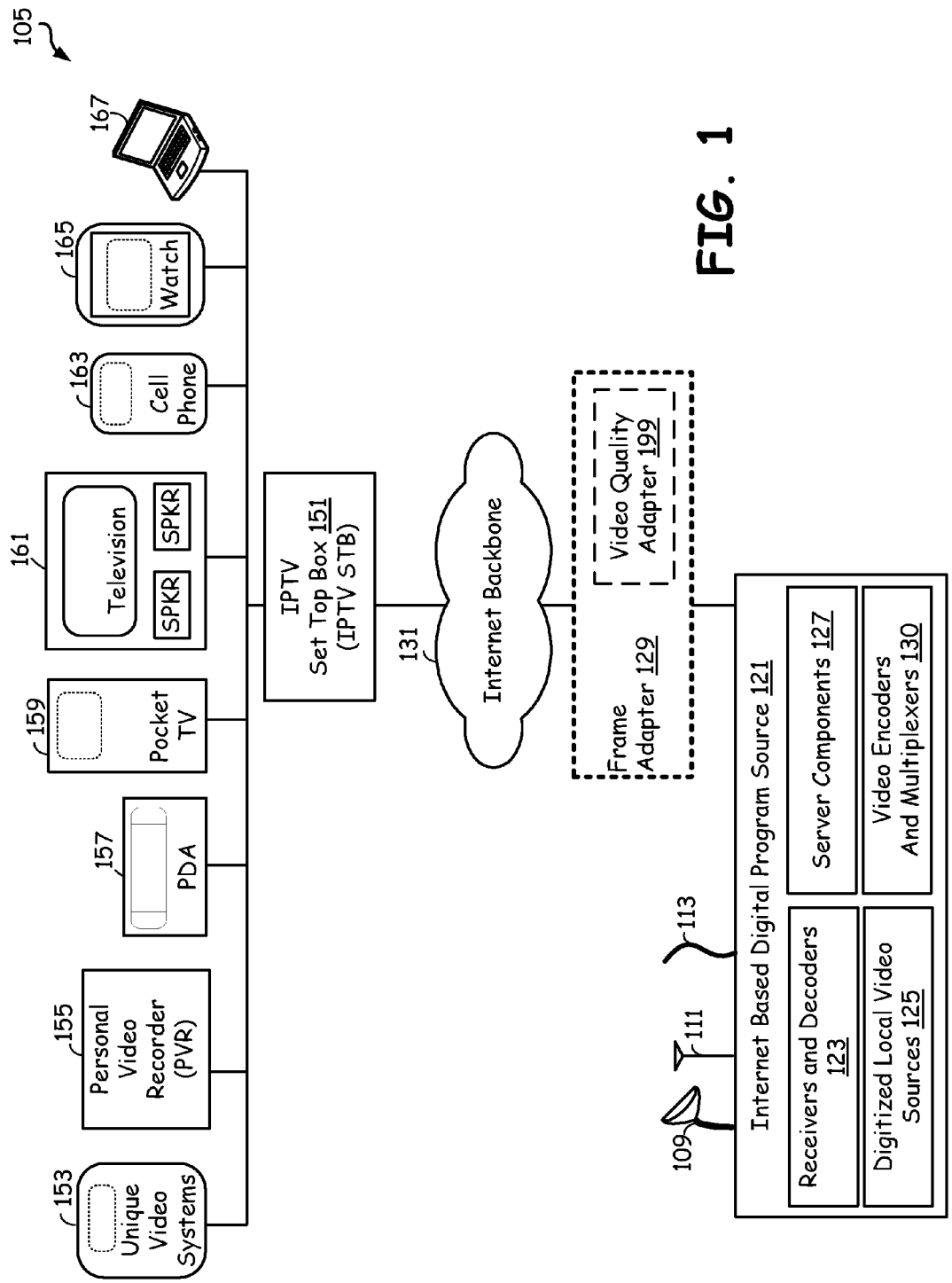
FIG. 1 is a system diagram illustrating an Internet infrastructure containing an Internet based digital program source followed by a frame adapter containing a video quality adapter and a plurality of recipient devices, wherein the video quality adapter, in accordance with the present invention, adapts frame rate, pixel resolution, and color resolution based upon a frame set backdrop (a quantitative representation given to a set of frames) and recipient device configuration.

FIG. 1 is a schematic block diagram illustrating an Internet infrastructure 105 containing an Internet based digital program source 121, a frame adapter 129 containing a video quality adapter 199, and a plurality of recipient devices 153, 155, 157, 159, 161, 163, 165, and 167. The video quality adapter 199, in accordance with the present invention, adapts frame rate, pixel and color resolutions based upon a frame set backdrop (a quantitative representation given to a set of frames) and recipient device 153, 155, 157, 159, 161, 163, 165 or 167 configurations to determine frame rate, pixel resolution, and color resolution. The frame adapter 129 may include a built in video quality adapter 199, which couples to an Internet based digital program source 121 and receives IPTV (Internet Protocol Tele-Vision) or Internet Protocol (IP) based video program packets (hereafter, IP program packets), for example. The frame adapter 129 with a built in video quality adapter 199 decodes incoming IP program packets, adapts video quality and re-encodes the resulting program signals adaptively to optimally suit the individual recipient devices 153, 155, 157, 159, 161, 163, 165 and 167 based upon their configurations and the frame set backdrop.

The video quality adapter's 199 video quality adaptation typically involves variations in frame rate, pixel and color resolutions based upon a quantitative representation given to a set of sequential frames (or frame set), here termed as the frame set backdrop. The frame set backdrop is a quantitative representation given to the frame set and that is used by the video quality adapter 199 to select a frame rate, pixel resolution, and color resolution for a set of video frames that it processes. Such processing may result in a lesser quality video stream that produces savings in transport data rate and recipient device processing requirements. However, the frame set backdrop may indicate to process and transmit the video frames at a highest quality level. Further, multiple intermediate characterizations of the frame set backdrop results in corresponding intermediate quality levels.

For example, as will be described further with reference to FIGS. 9-12, a recipient device may have a small screen size. Due to the small screen size, a user of the recipient device can only discern a limited amount of information from the display. Background content, e.g., not foreground content that focuses on a speaker, for example, may be entirely unimportant to the user of the recipient device due to the small screen size. Thus, even if a best resolution is supported by the video stream and display, the person viewing the screen of the recipient device will gain little to nothing from information contained in the background. Discernable/meaningful content of the background diminishes as the content of the background becomes fast moving, such as when the foreground subject of the images is moving, e.g., walking speakers, bicycle riding speakers, car chase scenes, etc. Further, even the foreground content becomes less important as the images are fast moving. Compounding this problem is that faster changing content results in larger encoded video frames causing greater encoding burden at a source device, higher data rate throughput requirements and higher decoding burden (processing burden) at the recipient device. The higher data rate throughput requirement is expensive, consumes network resources, and consumes communication interface resources of the recipient device. Higher processing burden by the recipient device not only consumes processing resources but may significantly shorten battery life, as can the larger communication interface requirements placed on the recipient device.

Thus, according to one aspect of the present invention, the video quality adapter 199 alters frame rate, pixel resolution, and/or color resolution of video frames prior to their transmission to a recipient device based upon the frame set backdrop and/or recipient device characteristics. Such alteration may include, for example, reducing a frame rate for rapidly changing video frames, reducing pixel resolution for rapidly changing video frames, and reducing color resolution for rapidly changing video frames. A definition of rapid change is determined by the video quality adapter 199 based upon the relative characteristics of the video frames, the characteristics of the recipient device, and/or the available data throughput to the recipient device. The reduction in video frame rate, pixel resolution, and/or color resolution, while reducing video quality at the recipient device, does so in such a manner that produces little or no discernable in the viewed image as compared to the viewing of higher quality frames. This is because even video having the best video quality available for delivery to the recipient device representative of the fast moving images produces poor images due to the capabilities of the recipient device, e.g., screen size, available processing resources, etc. When the frame set backdrop indicates that higher video quality is justified, frame rate, pixel resolution, and/or color resolution is increased to provide a "better quality" video stream to the recipient device.

The video quality adapter 199 may process all video frames of a group of evaluated video frames. Alternately, the video quality adapter 199 may process a portion of the video frames of the group of evaluated video frames. Further, the video quality adapter 199 may alter characteristics of a portion of frames of the group of video frames to make some portions of the video frames have a differing quality than other portions of the video frames. For example, the video quality adapter 199 may select a portion of each frame as a foreground portion and a differing portion of each frame as a background portion. The video quality adapter 199 may then cause the foreground portion to have a higher quality level than the background portion.

The video quality adapter 199 may receive feedback from the recipient devices 153, 155, 157, 159, 161, 163, 165, and 167, containing their configuration information and utilize this information to adapt video quality. The process of video quality adaptation essentially minimizes Internet resource usage by the Internet based digital program source 121 at any given moment, and also reduces the necessary processing and buffering capabilities of the recipient devices 153, 155, 157, 159, 161, 163, 165 and 167.

The frame set backdrop may be expressed as a number/percentage, varying from 0 to 100, for example. For example, the frame set backdrop for a set of frames that contain fast action scenes would be very high, e.g., 70 to 100 because of the relative change between frames. For such fast action frames, frame rate, pixel resolution, and color resolution may be reduced without causing any discernable deterioration in the perceived quality of the video as viewed at the recipient device. In contrast, for a scene having little object motion/little image change from frame to frame, e.g., a dialogue sequence containing a set of frames that are mostly static or with little motion, the frame set backdrop would be low, e.g., 0 to 30. For this group of frames, a higher frame rate, greater pixel resolution, and greater color resolution may be produced by the video quality adapter 199. With these operations, the perceived video quality at the recipient device is high while the transport of the video information requires a relatively lesser data rate and the processing requirements at the recipient device are relatively lesser.

Before processing of video quality by the video quality adapter 199, the frame adapter 129 processes IP program packets by de-multiplexing audio, video and data signals, de-packetizing them and then, individually decompress the audio, video and data signals to extract raw digital audio, video and data signals. The compression technology may vary, depending upon the Internet based digital signal source 121, but typically, MPEG4 compression technology is employed for video and as MP3 compression technology is employed for audio. Once raw digital audio, video and data signals are extracted, the digital video signals are sent to the video quality adapter 199, which varies frame rate, pixel and color resolutions based upon the frame set backdrop and recipient device 153, 155, 157, 159, 161, 163, 165 or 167 video configurations such as screen size and aspect ratio, as mentioned in the above paragraphs. Feedback control data received from the concerned recipient device 153, 155, 157, 159, 161, 163, 165 or 167 may include: (a) Screen size; (b) Aspect ratio; (c) Required video data transfer rate; (d) Mono/Stereo/Surround sound audio capabilities; (e) Audio bandwidth reproduction capability; (f) Required audio data transfer rate; and (g) Data transfer rate.

The frame adapter 129, after video quality adaptation, optimally and adaptively compresses audio, video and data, re-packetizes, multiplexes them and delivers them to the individual recipient device such as 153, 155, 157, 159, 161, 163, 165 or 167. In another embodiment, some of these components of the frame adapter 129 along with the video quality adapter 199 are directly employed into the Internet based digital program source 121 (refer to the description of FIG. 3 for more details), by modifying existing video encoders and multiplexers 130.

The video compression technology used by the frame adapter 129 may take any of the available standards of compression such as MPEG4, which involves generation of a spatially compressed base or independent frames, followed by generation of rest of the temporal compression frames (reference frames and re-reference frames or predicted or bidirectional predicted frames) within a frame set. The number of reference frames and re-reference frames to be generated for optimal or adaptive compression depends upon the feedback control data (recipient device 153, 155, 157, 159, 161, 163, 165 or 167 configuration data) received by the frame adapter 129. The entire configuration data may include: (a) Audio Bandwidth required; (b) Mono, stereo and surround sound capabilities; (c) Screen aspect ratio and size; (d) Audio and video processing capabilities; and (e) Buffering capabilities.

A Set Top Box (STB) 151, if provided by the ISP and if same/similar functionality is not already incorporated into the recipient device 153, 155, 157, 159, 161, 163, 165 or 167, receives the IP program packets (containing video signals whose quality is adapted to the individual recipient device 153, 155, 157, 159, 161, 163, 165 or 167, and adaptively compressed; also containing adaptively compressed audio and data contents) and decodes them by de-multiplexing, de-packetizing, decompressing and converting back to their original analog audio, video and data signals (and if need be, modulating on a RF—Radio Frequency-carrier) and delivers the information to the recipient device 153, 155, 157, 159, 161, 163, 165 or 167. The Set Top Box (STB) 151 or recipient device 153, 155, 157, 159, 161, 163, 165, or 167 will also receives information embedded in the IP program packets that effectively indicates the number of frames to be displayed in a second, i.e., frame rate.

The STB 151 (or the recipient devices 153, 155, 157, 159, 161, 163, 165 and 167 themselves if decoding modules are incorporated into them) includes the capability of downloading and storing decoding algorithms (that is, decompression and de-packetization algorithms) and other firmware from the Internet based digital program source 121 directly, when needed. Decompression algorithms may vary depending on the compression technology and adaptive compression technology used by the frame adapter 129, in response to the feedback control data from the STB 151 or recipient devices 153, 155, 157, 159, 161, 163, 165, and 167.

The illustration 105 also depicts some of the typical recipient devices such as unique video systems 153 (which may include video devices such as projector), personal video recorder 155, PDA (Personal Digital Assistant) 157, pocket television 159, television 161, cell phone 163, watch 165 (with video screening capability built into them) and personal or laptop computer 167, communicatively coupled to the Internet based digital program source 121 via STB 151 (optionally), Internet backbone 131 and frame adapter 129. Each of the recipient devices 153, 155, 157, 159, 161, 163, 165 or 167 has its own optimal audio, video and data presentation capabilities (called here as the feedback control data or configuration data). The frame adapter 129, along with built-in video quality adapter 199, may be located at the premises of the ISP, where the Internet based digital program source 121 is also located. In addition, the Internet based digital program source 121 may also contain a satellite dish 109, an antenna 111 (to receive locally broadcast programs, for example) and cable or fiber optic connections 113, to communicate with external program sources.

For example, a pocket television 159 (with IPTV STB 151 functionality built-in and having WLAN—Wireless Local Area Network—reception capabilities) may receive IP program packets via a WLAN interface. When a user sets up the pocket TV 159, the frame adapter 129 receives pocket TV 159 configuration data sent by the pocket TV 159, which may be initiated by the pocket TV 159 itself. The frame adapter 129 in turn determines the video quality adaptation parameters along with compression technology and corresponding parameters, and then in conjunction with the Internet based digital program source 121, may upgrade the pocket TV 159 with appropriate decompression and quality adaptation algorithm(s) and other software/firmware as may be required. After this process, the pocket TV 159 is ready to receive IP program packets that contain video data with adaptive quality control and adaptive compression, along with audio and data signals with adaptive compression, via WLAN modem and present them to the user.

For example, the configuration data of the pocket TV 159 may include a small black and white or color screen (with corresponding screen size and aspect ratio) with 156 kbps video data requirements, and monaural audio requirements of 4 KHz bandwidth. The frame adapter 129 along with the audio quality adapter 199 accordingly delivers adaptively quality controlled and re-encoded packets to the pocket TV 159 to meet these requirements.

Figure 2:
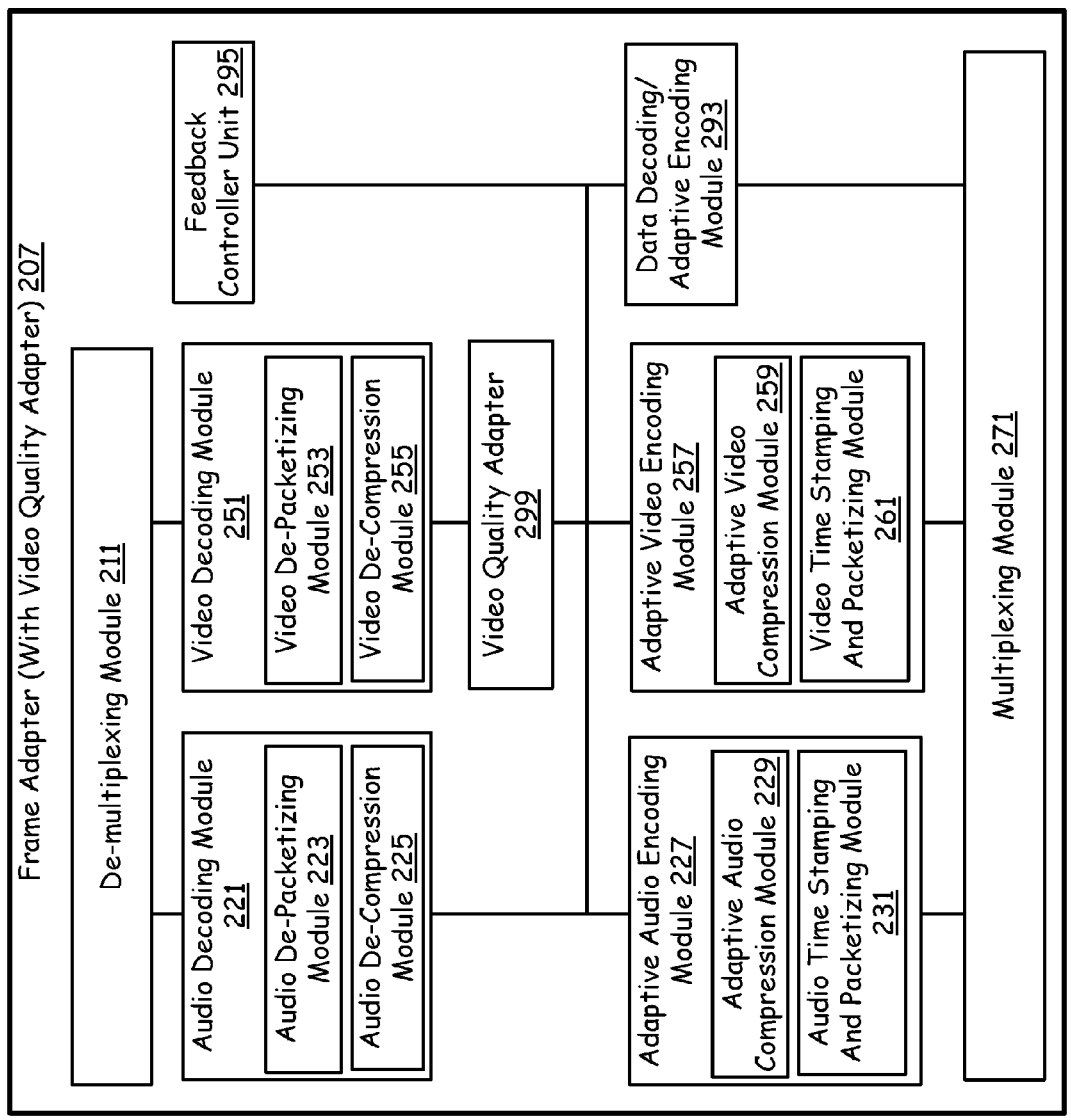
FIG. 2 is a schematic block diagram illustrating components of a frame adapter constructed in accordance with the embodiment of FIG. 1 of the present invention.

FIG. 2 is a schematic block diagram illustrating components of a frame adapter 207 that includes a video quality adapter 207 constructed in accordance with the embodiment of FIG. 1 of the present invention. The frame adapter containing video quality adapter 207 is incorporated at the front end of the Internet based digital program source (121 of FIG. 1) and contains a plurality of modules to de-multiplex, decode, adapt video quality and re-encode audio, video and data signals embedded in the IP program packets received from the Internet based digital program source.

The plurality of modules, at the receiving end of the frame adapter with the video quality adapter 207 include a de-multiplexing module 211 that separates audio, video and data IP program packets from the incoming IP program signals and delivers them to corresponding audio decoding module 221, video decoding module 251 and data decoding/adaptive encoding module 293. An audio decoding module 221 contains audio de-packetizing module 223 and audio decompression module 225. The audio de-packetizing module 223 removes IP protocol information from the audio IP packets and extracts and delivers compressed audio signals (for example, with MP3 compression format) to the audio decompression module 225. The audio decompression module 225 decompresses the incoming compressed audio and extracts the raw audio signal in a standard format. The raw audio signal is delivered to an adaptive audio encoding module 227, which includes an adaptive audio compression module 229 and audio time stamping and packetizing module 231. The adaptive audio compression module 229 compresses the raw audio signal in an optimal and adaptive manner. The feedback control data for determining optimum and adaptive compression is obtained from a feedback control unit 295. Then, the audio time stamping and packetizing module 231 inserts IP protocol information and time stamp into the incoming compressed audio stream to convert the compressed audio signals to IP audio program packets and delivers them to a multiplexing module 271.

Similarly, the video decoding module 251 contains video de-packetizing module 253 and video decompression module 255, which in turn extracts IP protocol information from the audio IP packets, extracts compressed video signals (for example, using MPEG4 compression format), and then decompresses the audio IP packets to extract the raw video signal in a standard format, respectively.

The video quality adapter's 299 functionality includes varying frame rate, pixel, and color resolutions in response to a frame set backdrop for a set of frames. In addition, the video quality adapter 299 uses feedback control data received from the recipient device to adapt video quality by varying the frame rate, pixel, and color resolutions. For example, a small screen, such as that of a handheld video player, may require very low pixel and color resolution, which along with frame rate may still be reduced based upon the frame rate backdrop. The frame set backdrop for a frame set that contain fast action scenes would be very high. For example, a racing car scene may involve quick changes in pixel content between frames and as a result even with reduced frame rate, a user may not be able to discern a significant change in quality. The pixel and color resolution may also be reduced during the periods when frame set backdrop is high without causing any discernable deterioration in quality of moving pictures in a video. On the contrary, dialogue and still frame scene may result in high frame rate and pixel, color resolutions corresponding to a frame set backdrop that is low.

Then, the adaptive video compression module 259 and video time stamping and packetizing module 261 contained in the adaptive video encoding module 257, respectively, compresses the video quality adapted signals in an optimal and adaptive manner and then inserts IP protocol information and time stamps on the frames of the compressed video stream and packages the compressed video signals into IP video program packets and delivers them to the multiplexing module 271. The feedback control data for determining an optimum number of referencing and re-referencing frames within a frame set (that is, adaptive and optimal compression) is obtained from the feedback control unit 295. The adaptive video compression module uses this information to create a desired sequence of independent and dependent frames for a frame sequence/stream. In addition, the data decoding/adaptive encoding module 293 decodes and then adaptively encodes the data stream in an analogous fashion to that of audio and video decoding and adaptive encoding process, based upon feedback control data from the feedback control unit 295.

Figure 3:
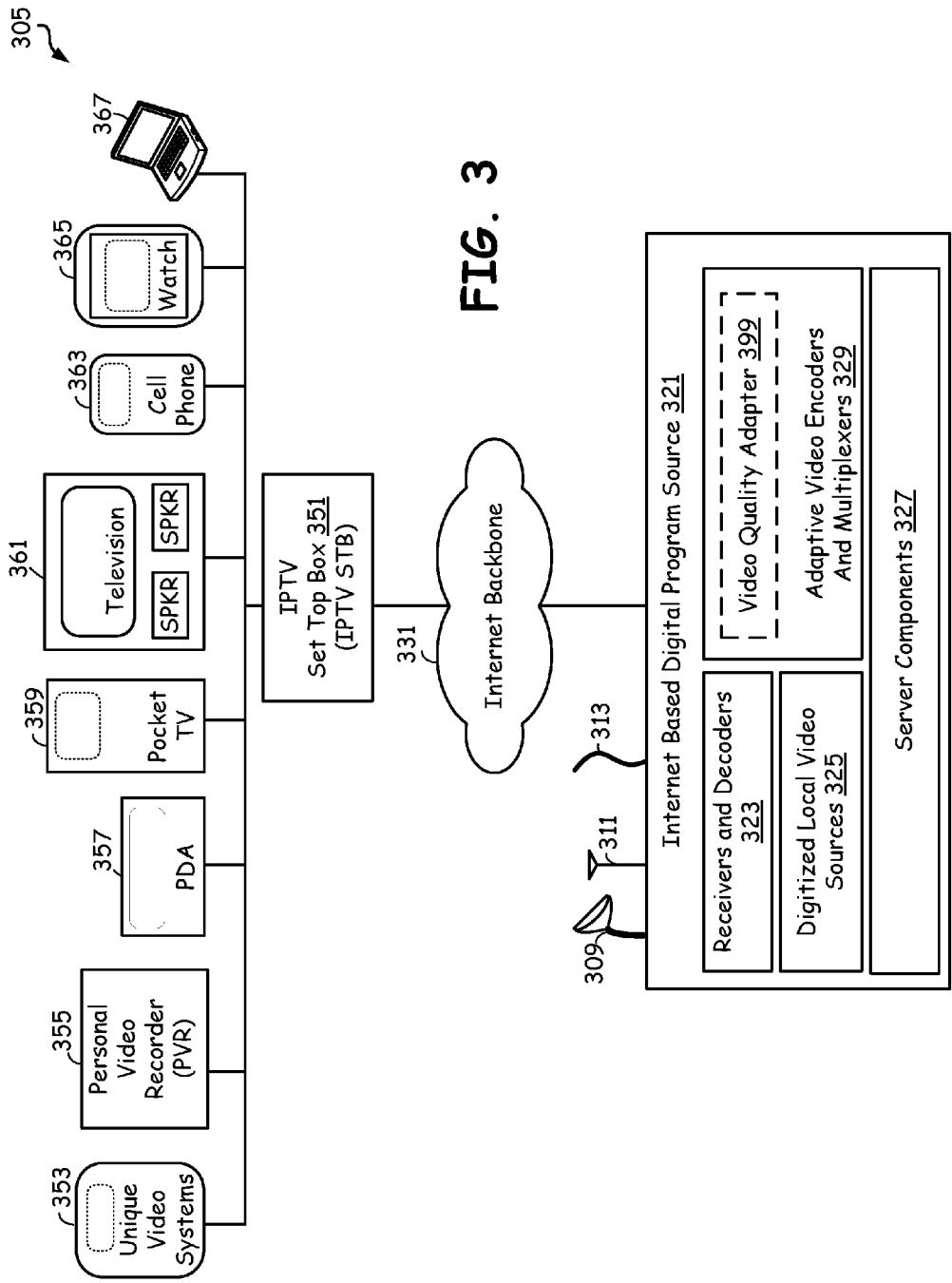
FIG. 3 is a system diagram illustrating an Internet infrastructure containing an Internet based digital program source with a (modified) adaptive encoder and a built-in multiplexer and video quality adapter, wherein the video quality adapter, in accordance with the present invention, adapts frame rate, pixel and color resolution based upon a frame set backdrop and recipient device configurations.

FIG. 3 is a schematic block diagram illustrating an Internet infrastructure 305 containing an Internet based digital program source 321 with a (modified) adaptive encoder and multiplexer 329 that contains a video quality adapter 399, and a plurality of recipient devices 353, 355, 357, 359, 361, 363, 365 and 367, wherein the video quality adapter 399, in accordance with the present invention, adapts frame rate, pixel and color resolution based upon a frame set backdrop and recipient device 353, 355, 357, 359, 361, 363, 365 or 367 configurations. The illustration 305 is another embodiment of the present invention, wherein the adaptive encoder and multiplexing circuitry 329 containing the video quality adapter 399 (optionally, with a built in transcoder) is built into the Internet based digital program source 321.

The illustration 305 depicts typical recipient devices such as unique video systems 353, personal video recorder 355, PDA (Personal Digital Assistant) 357, pocket television 359, television 361, cell phone 363, watch 365 (with video screening capability built into them), and personal or laptop computer 367, communicatively coupled to the Internet based digital program source 321 (optionally via an IPTV STB 351) and Internet backbone 331. Each of the recipient device 353, 355, 357, 359, 361, 363, 365 or 367 has its own corresponding audio, video and data presentation capabilities (called here as the feedback control data or configuration data), and may have built-in IPTV STB functionality.

The illustration 305 also depicts various components of the Internet based digital program source 321 that include receivers and decoders 323, digitized local video sources 325, server components 327, communication tools to receive external programs from their source such as a satellite dish 309, an antenna 311 and cable or fiber optic connections 313, and the (modified) adaptive encoder and multiplexer 329 containing a video quality adapter 399.

The adaptive encoder and multiplexing circuitry 329 receives raw audio, video and data signals from digitized local video source 325 or receivers and decoders 323 (that is, from an external program source). Optionally, the adaptive encoder and multiplexing circuitry 329 transcodes the raw audio, video and data signals to optimally suit the requirements of the recipient device 353, 355, 357, 359, 361, 363, 365 or 367. Then, the video quality adapter 399 (built in to the adaptive video encoders and multiplexers circuitry 329) varies frame rate, pixel and color resolutions in accordance with a frame set backdrop and feedback control data received from the recipient device 353, 355, 357, 359, 361, 363, 365 or 367, such that frame rate, pixel resolution, and color resolution is selected for a determined frame set backdrop and/or for recipient device configuration.

The adaptive encoder and multiplexing circuitry 329 receives feedback control data containing recipient device specific 353, 355, 357, 359, 361, 363, 365 or 367 configuration data and adaptively encodes the transcoded and quality adapted video signals, along with raw or transcoded audio and data signals. The encoding process may involve adaptive compression, packetizing and multiplexing before delivery to an individual recipient device such as 353, 355, 357, 359, 361, 363, 365, or 367. The video compression employed by the adaptive encoder and multiplexing circuitry 329 may take the form of any of the available standards of compression such as MPEG4, while audio compression may involve MP3 technology.

An IPTV STB 351 (the functionality of the IPTV STB 351 may also be directly incorporated into the recipient device 353, 355, 357, 359, 361, 363, 365, or 367) receives these IP program packets and decodes them by de-multiplexing, de-packetizing, decompressing, and converting back to analog audio and video for display/presentation and data signals. In addition, the IPTV STB 351 (or the recipient devices 353, 355, 357, 359, 361, 363, 365 or 367 themselves if decoding modules are incorporated into them) has the capability to download and install necessary firmware (that includes frame rate, pixel and color resolution adaptation, decompression and de-packetization algorithms) from the Internet based digital program source 321 directly, when needed.

For example, a HDTV 361 may have a built in functionality of an IPTV STB 351 and receives IP program packets from the Internet based digital program source 321. The IP program packets contain video signals that are transcoded (optionally), quality adapted and adaptively compressed video signals, along with transcoded (optionally) and adaptively compressed audio and data signals. Initially, the Internet based digital program source 321 downloads and installs firmware containing appropriate algorithms that are necessary to handle video transcoding, quality adaptation, adaptive compression and also audio and data transcoding and adaptive compression. The adaptive encoder and multiplexing circuitry 329 along with the video quality adapter 399 transcodes (optionally), quality adapts, adaptively compresses video signals to HDTV video configurations (that includes video processing and buffering capabilities, screen size and aspect ratio) along with transcoded and adaptively compressed audio to suit audio configurations (that includes surround sound quality, audio processing and buffering capabilities) and data signals.

Figure 4:
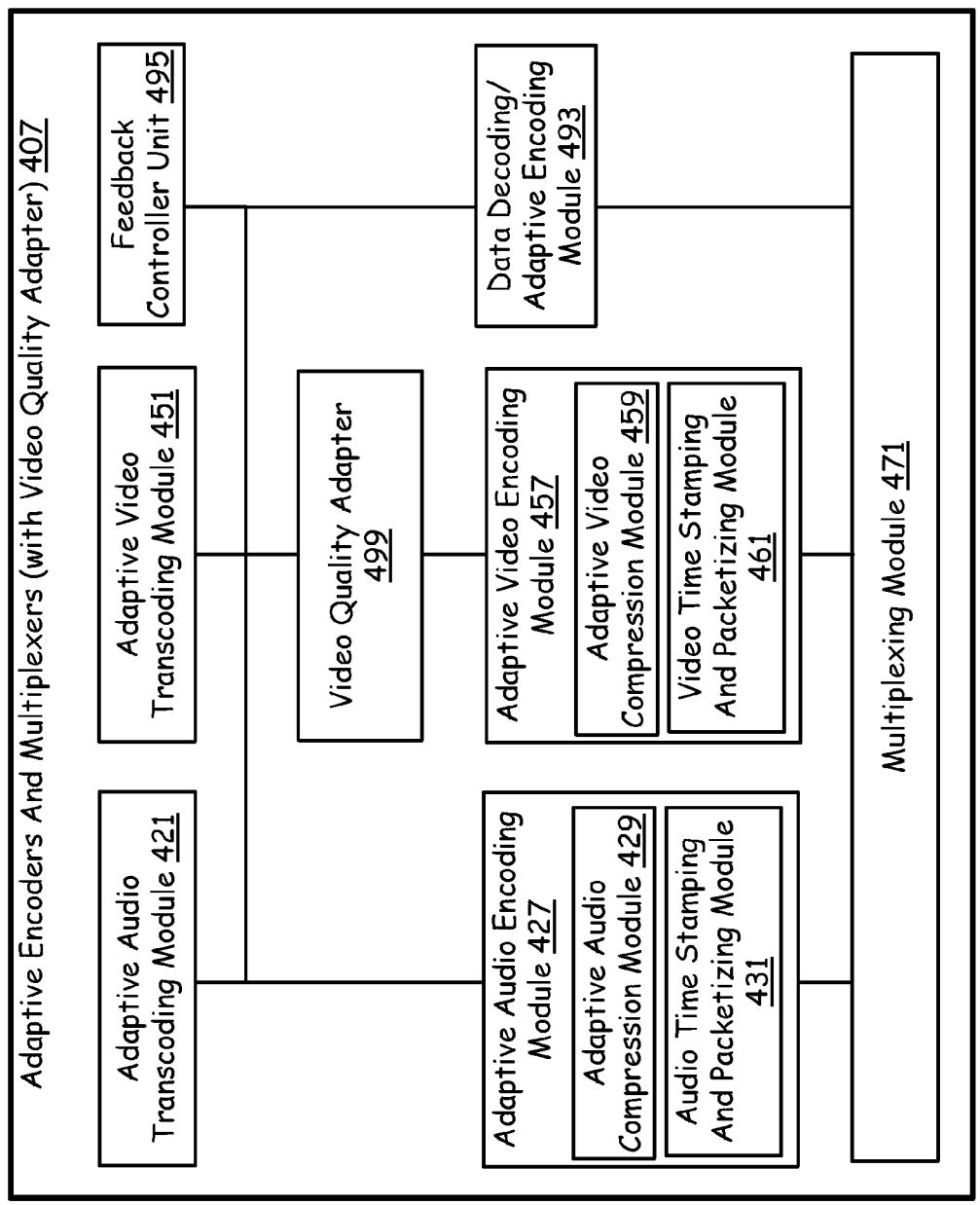
FIG. 4 is a schematic block diagram illustrating components of an adaptive encoder and multiplexer containing a video quality adapter constructed in accordance with the embodiment of FIG. 3 of the present invention.

FIG. 4 is a schematic block diagram illustrating components of an adaptive encoder and multiplexer 407 containing a video quality adapter 499 constructed in accordance with the embodiment of FIG. 3 of the present invention. The adaptive encoder and multiplexer 407 containing the video quality adapter 499 is incorporated into the Internet based digital program source (321 of FIG. 3) and contains a plurality of modules to adaptively and optimally transcode, adapt video quality, and encode digital program signals received from an external (or a local program source).

An adaptive audio transcoding module 421 contained in the adaptive encoder and multiplexer 407 transcodes adaptively the raw audio signal obtained from a local program source. The feedback control data for determining optimum and adaptive transcoding is obtained from a feedback control unit 495. The parameters for optimum audio transcoding may include bandwidth required for a recipient device along with mono, stereo and surround sound capabilities. Then, an adaptive audio compression module 429 and audio time stamping and packetizing module 431 contained in an adaptive audio encoding module 427 compresses the transcoded audio signal in an optimal and adaptive manner and then, inserts IP protocols and time stamps into the transcoded and compressed audio stream to convert the data to IP audio program packets and deliver them to a multiplexing module 471. The feedback control data for determining optimum and adaptive compression is obtained from a feedback control unit 495.

Similarly, an adaptive video transcoding module 451 contained in the adaptive encoder and multiplexer 407 transcodes adaptively the raw video signal obtained from a local digital program source based upon feedback control data that is obtained from the feedback control unit 495. Parameters for optimum video transcoding may include size and aspect ratio of a display of the recipient device along with processing and buffering capabilities of the recipient device.

Then, the video quality adapter 499 varies frame rate, pixel, and color resolution of video frames in accordance with a frame set backdrop and feedback control data. The feedback control data is received from the recipient device via the feedback control unit 495. Typically, the frame set backdrop for a frame set that contain fast action scenes is high and that for dialogue and still frame sets is low.

An adaptive video encoding module 457 contained in the adaptive encoder and multiplexer 407 contains an adaptive video compression module 459 and video time stamping and packetizing module 461 that compress the transcoded and quality adapted video signal in an optimal and adaptive manner and then insert IP protocols and time stamp on the incoming transcoded and compressed video stream to convert to IP video program packets and deliver them to the multiplexing module 471. The feedback control data for determining optimum number of referencing and re-referencing frames within a frame set (that is, adaptive and optimal compression) is obtained from the feedback control unit 495, which in turn is received from the respective recipient video device.

The data decoding/adaptive encoding module 493 decodes and then adaptively encodes the data stream in an analogous fashion, in some embodiments, to that of audio and video decoding and adaptive encoding process, based upon feedback control data from the feedback control unit 495. In addition, if the adaptive encoder and multiplexer 407 receives a plurality of video programs to be encoded adaptively, packetized and multiplexed (such as a plurality television channels delivered simultaneously), the multiplexing module 471 may have appropriate circuitry to multiplex the plurality of video programs, in addition to multiplexing audio, video and data IP program packets within each of these video programs.

Figure 5:
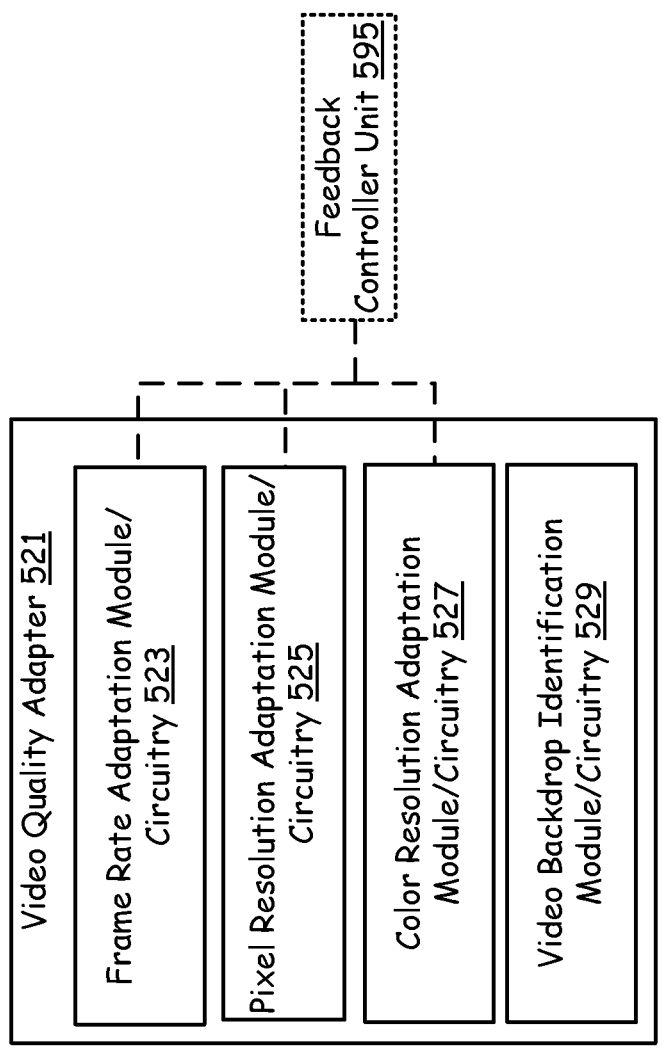
FIG. 5 is a schematic block diagram illustrating components of a video quality adapter circuitry constructed in accordance with the embodiment of FIG. 1 and FIG. 3 of the present invention.

FIG. 5 is a schematic block diagram illustrating components of video quality adapter module/circuitry 521 constructed in accordance with the embodiment of FIG. 1 and FIG. 3 of the present invention. The video quality adapter circuitry 521 contains a plurality of modules that vary frame rate, pixel and color resolution based upon a frame set backdrop and control feedback data obtained from an external feedback control unit 595. These modules include frame rate adaptation module 523, pixel resolution adaptation module

525, color resolution adaptation module 527, and video backdrop identification module 529.

The video backdrop identification module 529 determines, in cooperation with other components in some embodiment, the frame set backdrop by selecting a set of sequential frames and then determining the quantitative difference between sequential frames. The process of determining the frame set backdrop may also incorporate human element by using various video presentations of various scenarios that in turn determines if there is any significant deterioration of video quality. This human element may help fine tune the quantitative representation identified by the video backdrop identification module 529.

A set of frames may be video frames delivered to the video backdrop identification module 529 over a selected set or time period. For example, if there are 30 frames per second, the frame set could contain 30 frames. On the contrary a frame set could also contain frames belonging to more than one second such as 120 frames belonging to a 5 seconds of video signal at the rate of 24 frames per second. Also, the set of frames selected may vary based upon their content, historical data, data throughput supportable, and feedback from a recipient device such as available processing resources and/or battery life.

Once the frame set backdrop is determined by the video backdrop identification module 529, feedback control data (that contains video configurations of recipient device, such as video processing and buffering capabilities, aspect ratio and screen size, battery life, processing abilities, available processing resources) and digital video signals of entire set of frames belonging to the chosen frame set are delivered to frame rate adaptation module 523, followed by the pixel resolution adaptation module 525, and color resolution adaptation module 527. These modules 523, 252 and 527 use the input of the frame set backdrop and feedback control data to adapt quality of the video frames. A high frame set backdrop and small screen size of the recipient device, for example, may cause the frame rate adaptation module 523, pixel resolution adaptation module 525 and color resolution adaptation module 527 to drop reduce the frame rate, alter ratios of independent to dependent frames, alter pixel resolution, and alter color resolution.

For example, a small resolution video (having low frame rate and pixel and color resolutions) taken by a mobile phone is very clear when viewed on the mobile phone itself with no discernable appearance of poor quality, but when watched on a big screen television may show extremely poor video quality. Therefore, when adapting video quality to these small screen devices, the video quality adapter 521 may keep frame rate, pixel resolution, and/or color resolution low such that no discernable video quality reduction is viewable on the recipient device.

In addition, the video quality adapter 521 varies the frame rate and pixel and color resolutions in accordance with scenes in consideration. For example, the frame set backdrop for a set of frames that contain fast action scenes (such as that of a racing car) would be very high because of quick changes between frames and as a result minimum number of frames is retained in this case. The pixel and color resolution may also be reduced during the periods when frame set backdrop is high, without causing any discernable deterioration in quality of moving pictures in a video. In contrast, for a dialogue containing set of frames or static picture containing set of frames, the frame set backdrop would be low. As a result, the number of frames dropped in a frame set would be minimum, frame rate would be increased, and/or pixel and color resolution would be fairly high. Further variations in frame rate and pixel and color resolution, depending upon the video configuration information of the recipient device, are possible.

Thus, the process of video quality adaptation may minimize Internet resource usage by the Internet based digital program source at any given moment, and also reduce the processing and buffering requirements of the recipient devices (thus increasing performance). Typically, the frame set backdrop is expressed in percentage, varying from 0% frame rate, pixel and color resolution reductions to theoretically up to 100% reductions (obviously, this is not practical, but the reductions may go at least beyond 50% in some cases); that is, theoretically the frame set backdrop varies between 0% to 100%.

Note that the modules of the video quality adapter 521, including the frame rate adaptation module 523, the pixel resolution adaptation module 525, the color resolution adaptation module 527, and the video backdrop identification module may be embodied as hardware, software, or a combination of hardware and software. Further, the modular functionality described with reference to FIG. 5 may be embodied in a digital processor that executes software instructions to perform the described operations/functions. Thus, all of the modular functionality of the video quality adapter 521 may be executed by a single device that does not have physical modularity but simply has functional modularity as described. This modular functionality may be executed in parallel concurrently on the video frames of the video frame set.

Figure 6:
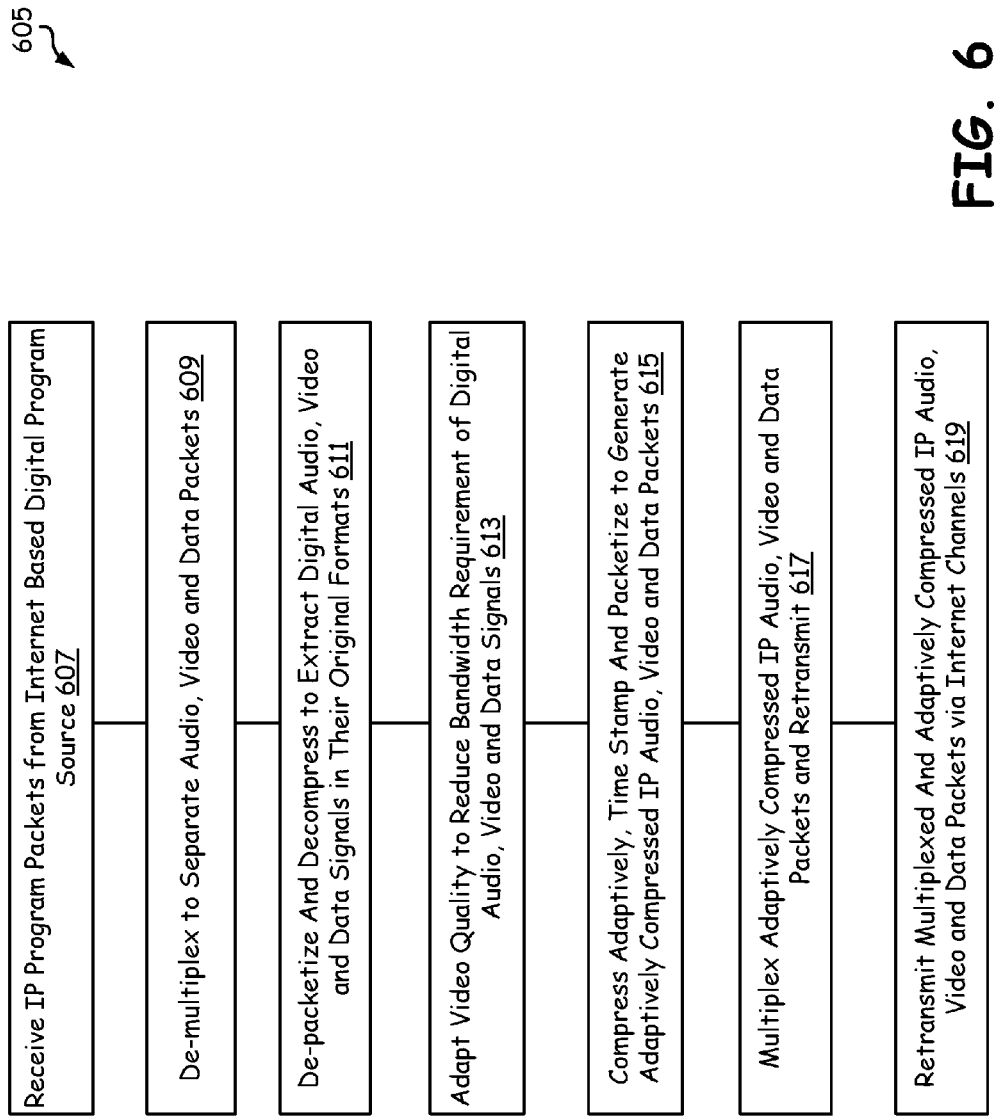
FIG. 6 is a flow diagram illustrating functionality of a frame adapter containing a video quality adapter, of FIG. 1.

FIG. 6 is a flow diagram illustrating functionality of the frame adapter containing video quality adapter, of FIG. 1. The functionality 605 begins at a block 607, when the frame adapter containing video quality adapter receives IP program packets from an Internet based digital program source. The Internet based digital program source may be any of the Internet Service Provider's (ISP's) equipment, video source provider equipment, or an intermediate resource's equipment. Such source or intermediate device may either generate programs such as videos of movies, speeches, music programs, or may process and re-route programs originated by other program sources such as television studios. The Internet based television, movies, videos and music programs, as available today, are typically referred to as IPTV (Internet Protocol Tele Vision) and supplied by the ISPs via Internet backbone, APs (Access Points), using broadband services. At the receiving end an IPTV STB (IPTV Set Top Box) removes Internet protocol information and decompresses the audio, video and data signals and delivers to a television unit, personal computer or any other video device. That is, the ISPs typically use internet protocol based packets to deliver compressed digital audio, video and data contents to the recipient devices, which will be converted back (by a Set Top Box—STB—, for example) to appropriate signals as applicable to a corresponding recipient device.

At a next block 609, the frame adapter containing video quality adapter de-multiplexes incoming IP program packets to separate audio, video and data packets. Then, at a next block 611, the frame adapter containing video quality adapter de-packetizes the separated audio, video and data packets to remove internet protocol information and extracts compressed digital audio, video and data contents. This compression of audio, video and data signals are done at the Internet based digital program source to save Internet bandwidth, by using compression technologies such as MPEG4 and MP3. Then, the frame adapter containing video quality adapter decompresses the compressed digital audio, video and data contents to extract digital audio, video and data signals in their original formats.

At a next block 613, the frame adapter containing video quality adapter adapts video quality to, in some operations, reduce bandwidth requirements of the Internet as well as to reduce processing and buffering loads at the recipient device. The video quality adaptation involves varying frame rate, pixel and color resolutions in accordance with a frame set backdrop (determined based upon minimum number of frames per second and minimum pixel and color resolutions required, for a set of frames, for not having a discernable difference in picture quality) and feedback control data (which is received from the recipient device via a feedback control unit built into the frame adapter containing video quality adapter). For example, the frame set backdrop for frame set that contains fast action scenes is high and that for dialogue and still frame scene is low.

Then, at a next block 615, the frame adapter containing video quality adapter adaptively compresses the digital audio, video and data signals to generate adaptively compressed digital audio, video, and data signals. The adaptive compression involves varying compression parameters such as number of reference and re-referencing frames, to optimally suit the buffering, processing capabilities and other audio and video configurations (such as screen size, aspect ration and audio reproduction capabilities and required bandwidth) of the recipient device. Then, the frame adapter containing video quality adapter inserts time stamps (to be able to sequentially re-assemble program packets at the recipient device) and packetizes (that is to insert internet protocol information that includes the recipient device internet address) the resulting signals. Then, at a next block 617, the frame adapter containing video quality adapter multiplexes adaptively compressed IP audio, video and data packets. At a final block 619, the frame adapter containing video quality adapter retransmits these IP program packets to the recipient device via Internet.

Figure 7:
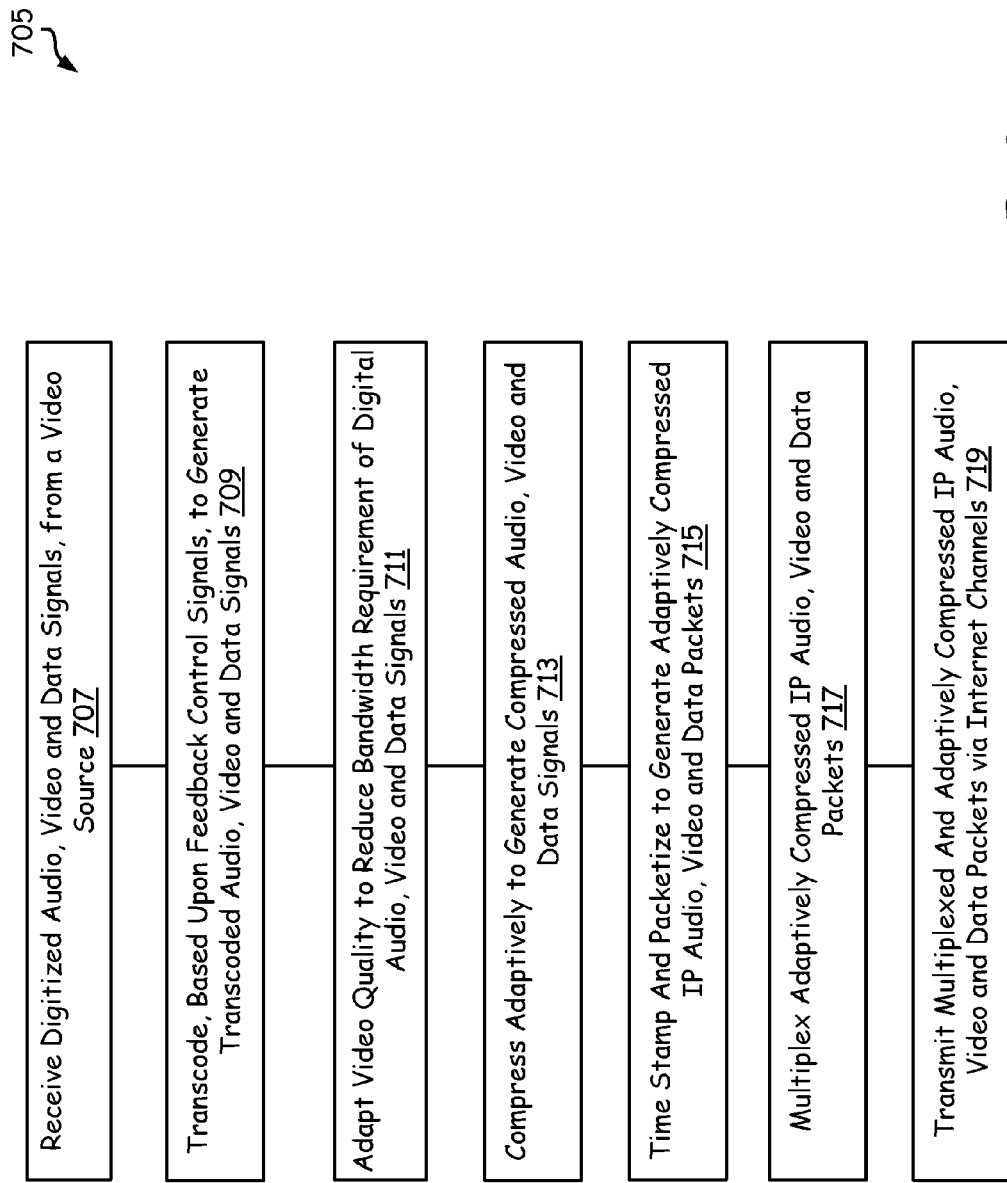
FIG. 7 is a flow diagram illustrating functionality of an adaptive encoder and multiplexer containing a video quality adapter, wherein the adaptive encoder receives digital signals from a local video source (or de-multiplexed, decoded and decompressed video signals from external sources)

FIG. 7 is a flow diagram illustrating functionality of the adaptive encoder and multiplexer containing video quality adapter of FIG. 3, wherein the adaptive encoder and multiplexer containing video quality adapter receives digital signals from a local video source (or de-multiplexed, decoded and decompressed video signals from external sources). The functionality 705 begins at a block 707, when the adaptive encoder and multiplexer containing video quality adapter receives digital program signals directly from a local video source (or video program signals obtained, if necessary by de-multiplexing, de-packetizing and decompressing IP program packets, from satellite, cable or fiber-optic channels). The local video source may simply be a set of programmable digital video players that play various videos at scheduled times or on demand.

Then, at a next block 709, the adaptive encoder and multiplexer containing video quality adapter adaptively transcodes the digital audio, video and data signals to generate adaptively transcoded digital audio, video and data signals, based upon control signal parameters from a feedback control unit built into the adaptive encoder and multiplexer containing video quality adapter.

At a next block 711, the adaptive encoder and multiplexer containing video quality adapter adapts video quality by varying frame rate, pixel and color resolutions in accordance with a frame set backdrop (a quantitative representation of minimum number of frames per second and minimum pixel and color resolutions required, for a set of frames, for not having a discernable difference in picture quality) and feedback control data (which is received from the recipient device via a feedback control unit built into the frame adapter containing video quality adapter). The feedback control data for a recipient device may include: (a) Bandwidth required; (b) Mono, stereo and surround sound capabilities; (c) Screen aspect ratio and size; (d) Audio and video processing capabilities; and (e) Buffering capabilities.

Then, at a next block 713, the adaptive encoder and multiplexer containing video quality adapter adaptively compresses the digital audio, video and data signals to generate adaptively compressed digital audio, video and data signals, based upon feedback control data obtained from the corresponding recipient device (as mentioned in previous paragraphs). The adaptive compression may involve varying number of reference and re-referencing frames for video signals.

At a next block 715, the adaptive encoder and multiplexer containing video quality adapter inserts time stamps to enable the recipient device to sequentially re-assemble program packets. Then, the adaptive encoder and multiplexer containing video quality adapter packetizes the resulting time stamped audio, video and data signals, by inserting IP (Internet Protocol) information that includes the recipient device internet address. Then, at a next block 717, the adaptive encoder and multiplexer containing video quality adapter multiplexes adaptively compressed IP audio, video and data packets. At a final block 719, the adaptive encoder and multiplexer containing video quality adapter retransmits these IP program packets to the recipient device via Internet.

Figure 8:
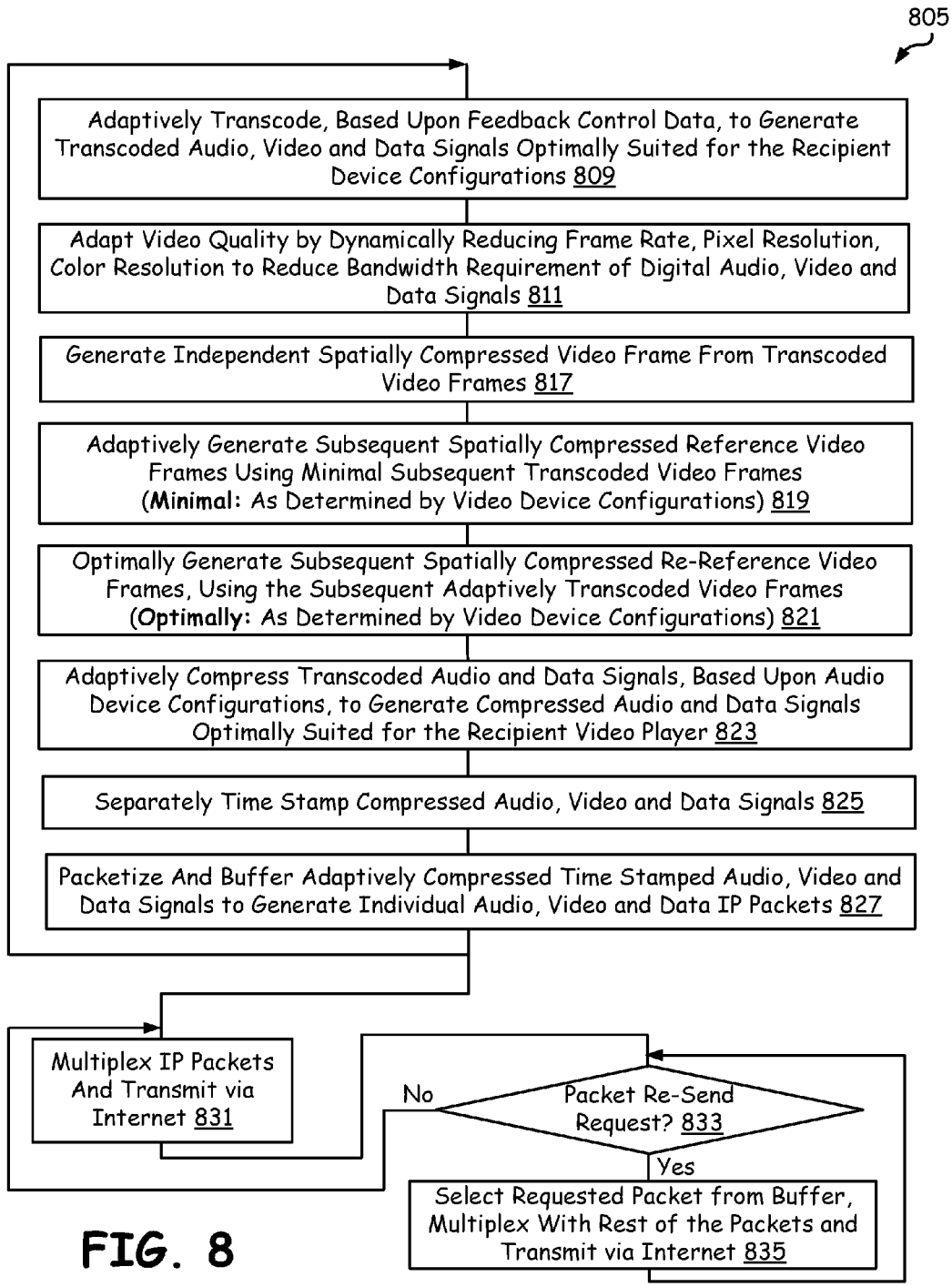
FIG. 8 is a flow diagram illustrating adaptive transcoding, video quality adaptation, and/or adaptive encoding functionalities, partially or entirely employed by the frame adapter of FIG. 1 and/or the adaptive encoder and multiplexer of FIG. 2 in accordance with the present invention.

FIG. 8 is a flow diagram illustrating adaptive transcoding, video quality adaptation and/or adaptive encoding functionalities, partially or entirely employed by the frame adapter of FIG. 1 or adaptive encoder and multiplexer of FIG. 2 containing video quality adapter, in detail, in accordance with the present invention. The frame adapter/adaptive encoder and multiplexer (containing video quality adapter) flow cycle 805 begins with adaptive transcoding, followed by video quality adaptation and then encoding of video program signals, this flow repeats continuously until transmission is stopped and are illustrated by blocks 809, 811, 817, 819, 821, 823, 825 and 827.

The cycle of flow begins at the block 809, when the frame adapter/adaptive encoder and multiplexer (containing video quality adapter) adaptively transcodes the digital audio, video and data signals to generate optimally suited audio, video and data signals, based upon recipient device configuration information obtained via the feedback control unit built into the frame adapter/adaptive encoder and multiplexer (containing video quality adapter). The entire configuration data may include: (a) Bandwidth required; (b) Mono, stereo and surround sound capabilities; (c) Screen aspect ratio and size; (d) Audio and video processing capabilities; (e) Buffering capabilities; and (f) available battery resources (if applicable) of a recipient device.

Then, at the next block 811, the frame adapter/adaptive encoder and multiplexer (containing video quality adapter) adapts video quality by altering frame rate, pixel and color resolutions in response to a frame set backdrop (determined based upon minimum number of frames per second and minimum pixel and color resolutions required, for a set of frames, for not having a discernable difference in picture quality) and feedback control data. The frame set backdrop, for frame set that contain fast action scenes, is high, because of quick changes in pixel contents between frames and as a result even with reduced frame rate, a user may not be able to discern a significant change in quality. In contrast, for example, for dialogue and still frame scenes the frame set backdrop is low. The feedback control data based video quality adaptation, for example, for a mobile phone may be based upon small sized screen and low video processing and buffering capabilities and as a result the frame adapter/adaptive encoder and multiplexer (containing video quality adapter) may reduce the frame rate and keep very low pixel and color resolutions, which in turn may still be reduced based upon the frame rate backdrop (as mentioned above). Of course, in some operations, based upon the frame set backdrop the video quality will not be altered.

At the next block 817, the frame adapter/adaptive encoder and multiplexer (containing video quality adapter) generates spatially compressed independent or base video frames, from the transcoded and quality adapted video frames. At the next block 819, the frame adapter/adaptive encoder and multiplexer (containing video quality adapter) adaptively generates subsequent spatially compressed reference (predictive) video frames using minimal subsequent transcoded video frames. At the next block 821, the frame adapter/adaptive encoder and multiplexer (containing video quality adapter) adaptively generates subsequent spatially compressed re-reference (bidirectional predictive) video frames using minimal subsequent transcoded video frames. At the next block 823, the frame adapter/adaptive encoder and multiplexer (containing video quality adapter) generates adaptively compressed audio signals from the transcoded audio signals, based upon audio configurations of the recipient device. Then, the frame adapter/adaptive encoder and multiplexer (containing video quality adapter) adaptively compresses data signals if necessary.

At the next block 825, the frame adapter/adaptive encoder and multiplexer (containing video quality adapter) inserts time stamps separately to compressed audio, video and data signals. At the next block 827, the frame adapter/adaptive encoder and multiplexer (containing video quality adapter) packetizes the resulting time stamped audio, video and data signals, by inserting IP (Internet Protocol) information that includes the recipient device internet address, and in addition, buffers some of the latest audio, video and data packets for resending lost packets at a later time.

Then, at a next block 831, the frame adapter/adaptive encoder and multiplexer (containing video quality adapter) multiplexes adaptively transcoded, video quality adapted and adaptively compressed IP program packets generated by the processes of blocks 809, 811, 817, 819, 821, 823, 825 and 827 and retransmits via Internet. At a next decision block 833, the frame adapter/adaptive encoder and multiplexer (containing video quality adapter) verifies if any re-send requests are placed by the recipient device. If yes, at a next block 835, the frame adapter/adaptive encoder and multiplexer (containing video quality adapter) selects requested IP program packet from the buffer and re-sends the IP video program packet. If not at the decision block 833, then at the block 831, the frame adapter/adaptive encoder and multiplexer (containing video quality adapter) continues to multiplex adaptively transcoded, video quality adapted and adaptively compressed IP audio, video and data packets and to retransmit them to the recipient device via Internet.

Figure 9:
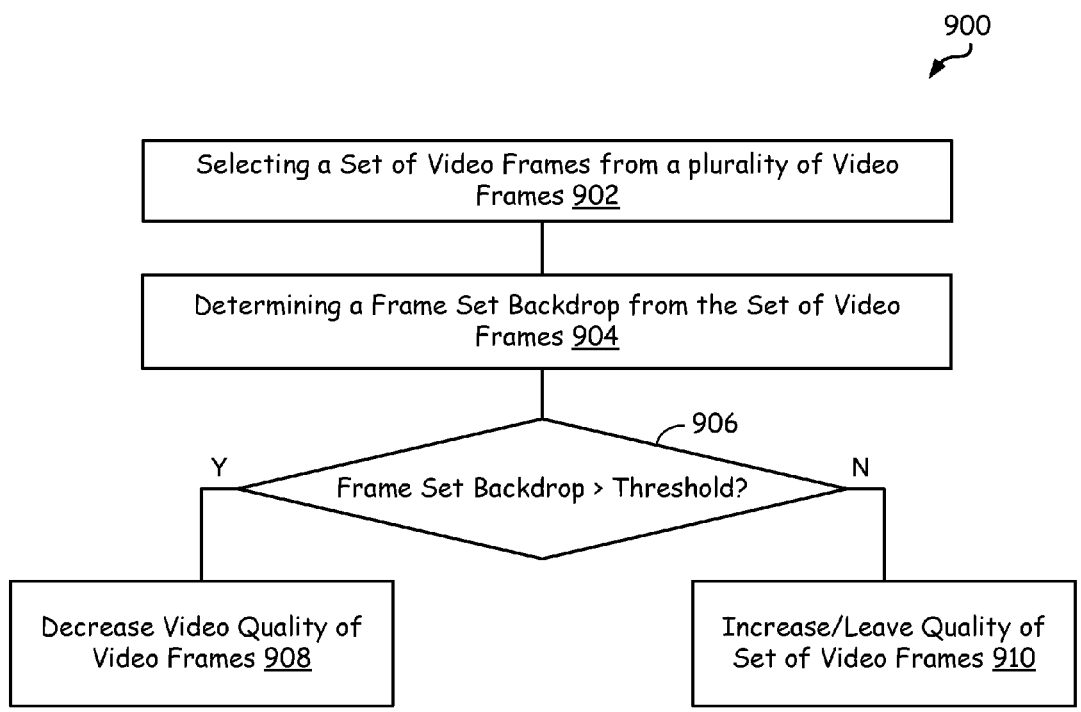
FIG. 9 is a flow chart illustrating operation according to the present invention for altering video quality of a video frames.

FIG. 9 is a flow chart illustrating operation according to the present invention for altering video quality of a video frames. Generally, the video frames are digital video frames that are encoded according to a video encoding standard such a version MPEG, for example. The operations 900 of FIG. 9 may be performed upon video frames after they have been decoded to an original or raw video format. The operations 900 of FIG. 9 may be performed by any of the various video processing devices previously described herein. Operation 900 commences with selecting a set of video frames from the video frames (Step 902). 14. The set of video frames may be selected from a larger set of video frames based upon content of video frames of the larger set of video frames. The set of frames may be selected for the operations 900 of FIG. 9 based upon their content, based upon an operating condition of a recipient device, based upon available data throughput rate, or another criteria.

Operation continues with determining a frame set backdrop from the set of video frames that is a characterization of the relative difference in content of the set of video frames (Step 904). As has been described previously herein and as will be described further with reference to FIGS. 10A-11B, the frame set backdrop is a characterization of the relative change in content among video frames of the set of video frames. The frame set backdrop may be expressed as a number/percentage, varying from 0 to 100, for example. For example, the frame set backdrop for a set of frames that contain fast action scenes would be very high, e.g., 70 to 100 because of the relative change between frames. For such fast action frames, frame rate, pixel resolution, and color resolution may be reduced without causing any discernable deterioration in the perceived quality of the video as viewed at the recipient device. In contrast, for a scene having little object motion/little image change from frame to frame, e.g., a dialogue sequence containing a set of frames that are mostly static or with little motion, the frame set backdrop would be low, e.g., 0 to 30. The frame set backdrop may be selected based upon a background portion of the set of video frames. Alternately, in some operations, the frame set backdrop may be selected based upon a foreground portion of the set of video frames.

With the frame set backdrop determined, it is compared to at least one threshold. This threshold may be a single threshold (as illustrated in FIG. 9) or may be multiple thresholds. This comparison is made at step 906 and a determination is made with regard to this comparison. When the frame set backdrop is greater than the threshold, video quality of the set of video frames is decreased (Step 908). Alternately, if the frame set backdrop is less than or equal to the threshold, the quality of the set of video frames may be unaltered or increased. In determining whether to, and how to alter video quality of video frames of the set of video frames, the characteristics of a recipient device are considered. These recipient device characteristics may include recipient device display characteristics, recipient device decoder characteristics, recipient device battery life, and recipient device processing availability.

In some of these operations of Steps 908 and 910, decreasing video quality of the set of video frames when the frame set backdrop is relatively higher includes producing a processed set of video frames having a lesser frame rate than the set of video frames and/or increasing/leaving quality of the set of video frames when the frame set backdrop is relatively lower includes leaving producing a processed set of video frames having an equivalent frame rate to the set of video frames. Further, the operations of Steps 908 and 910 may include decreasing video quality of the set of video frames when the frame set backdrop is relatively higher by producing a processed set of video frames having a lesser pixel resolution than the set of video frames and increasing/leaving quality of the set of video frames when the frame set backdrop is relatively lower by producing a processed set of video frames having an equivalent pixel resolution to the set of video frames.

Decreasing video quality of the set of video frames when the frame set backdrop is relatively higher may also include producing a processed set of video frames having a lesser color resolution than the set of video frames while increasing/leaving quality of the set of video frames when the frame set backdrop is relatively lower may include leaving producing a processed set of video frames having an equivalent color resolution to the set of video frames. Further, Steps 908 and/or 910 may include processing the set of video frames to produce a processed set of video frames by altering a ratio of independent frames to predictive frames such that the set of processed frames has a differing ratio of independent frames to predictive frames than does the set of frames.

Figure 10A:
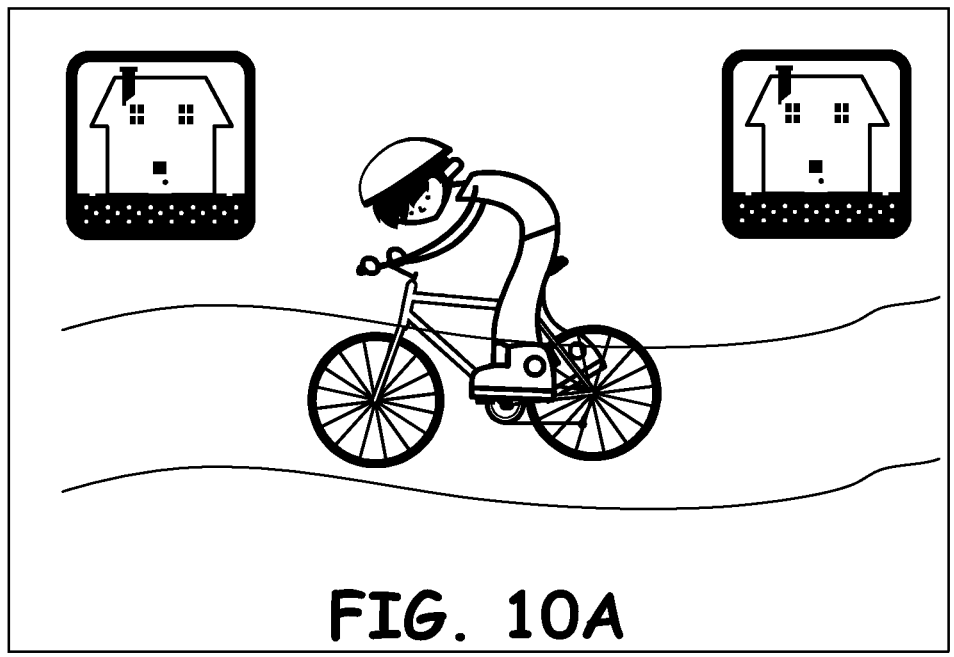
FIGS. 10A and 10B are diagrams illustrating video frames with a relatively large frame set backdrop.
Figure 10B:
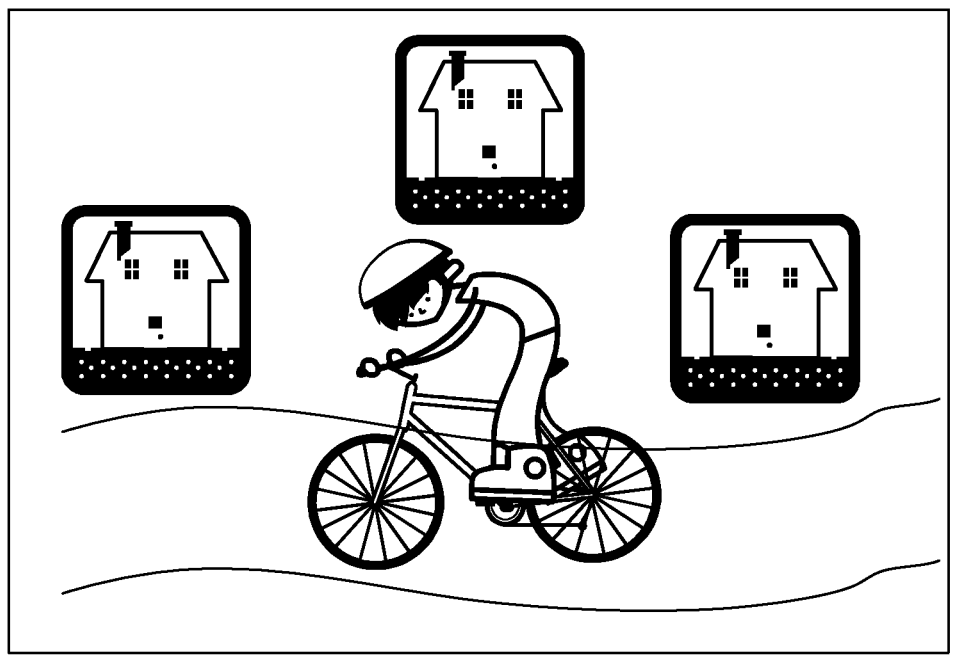

FIGS. 10A and 10B are diagrams illustrating video frames with a relatively large frame set backdrop. The foreground portion of FIGS. 10A and 10B is relatively unchanged. However, the background portion of FIGS. 10A and 10B is great. Thus, the frame set backdrop for the video frames of FIGS. 10A and 10B would be relatively large.

Figure 11A:
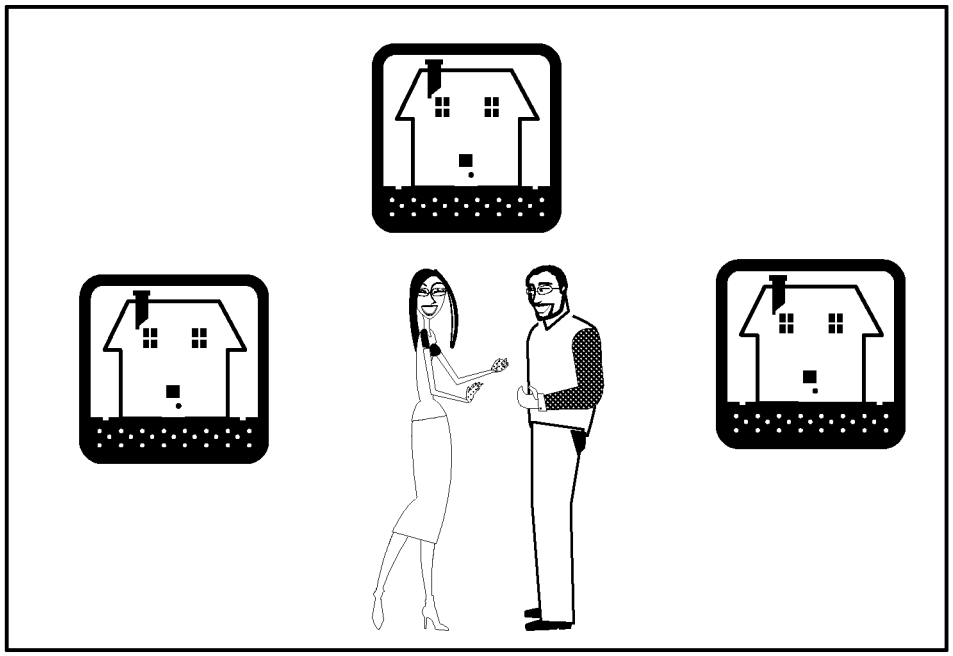
FIGS. 11A and 11B are diagrams illustrating video frames with a relatively small frame set backdrop.
Figure 11B:
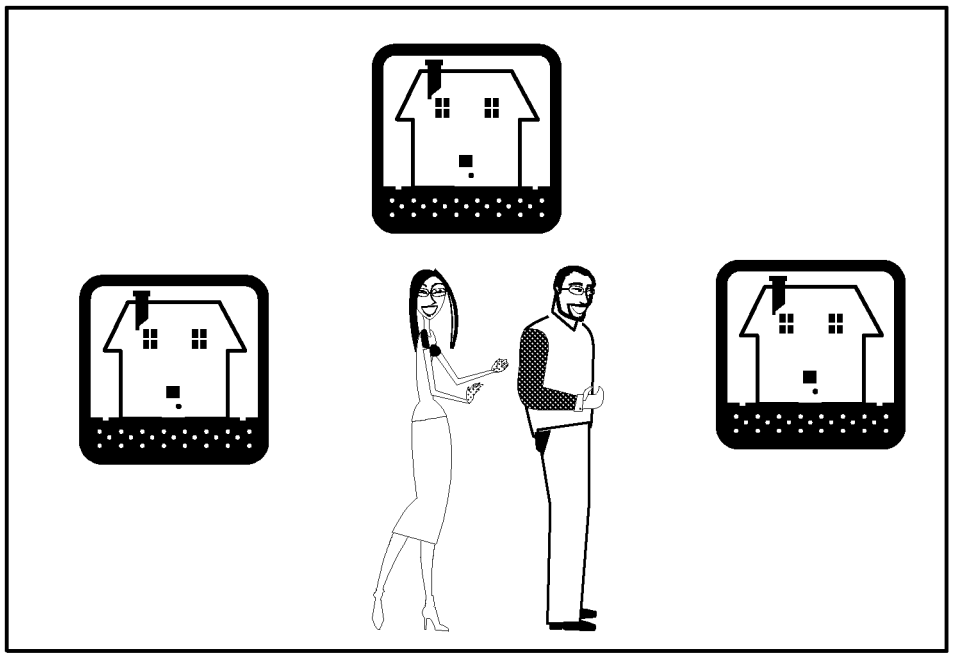

FIGS. 11A and 11B are diagrams illustrating video frames with a relatively small frame set backdrop. The foreground portions of FIGS. 11A and 11B is relatively unchanged and the background portions of FIGS. 11A and 11B is nearly identical. These frames could be considered dialogue frames and the frame set backdrop for the video frames of FIGS. 11A and 11B would be relatively small.

According to aspects of the present invention and based upon characteristics of a recipient device, the video frames of the frame set of FIGS. 10A and 10B would be processed to reduce their quality prior to transmission to the recipient device. This is because, since content of the frames of FIGS. 10A and 10B is rapidly changing, the perceived quality of display of these video frames would not be good even if they were transmitted with higher quality. With no real increase in perceived quality with greater video quality, which would require additional data throughput to deliver and additional processing by the recipient device, according to the present invention, this video is delivered with reduced quality. However, for the video frames of FIGS. 11A and 11B, the recipient device would be able to deliver video with a greater perceived quality if the video frames transmitted are of a higher quality. Thus, the video frames of FIGS. 11A and 11B are transmitted at a higher quality.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A processing device that operates on a set of video frames, the processing device comprising:
at least one communication interface; and
processing circuitry coupled to the at least one communication interface and operable to:
determine a frame set backdrop for the set of video frames, the frame set backdrop a characterization of the relative difference in content among video frames of the set of video frames;
decrease video quality of the set of video frames when the frame set backdrop is relatively higher indicating relatively greater content difference among video frames of the set of video frames; and
increasing/leaving quality of the set of video frames when the frame set backdrop is relatively lower indicating relatively lesser content difference among video frames of the set of video frames.

2. The processing device of claim 1, wherein the processing circuitry and communication interface are further operable to:
receive the set of video frames from a source device; and
process the set of video frames based upon recipient device characteristics; and
transmit the processed set of video frames to a recipient device.

3. The processing device of claim 2, wherein the recipient device characteristics are selected from the group consisting of at least:
recipient device display characteristics;
recipient device decoder characteristics;
recipient device battery life; and
recipient device processing availability.

4. The processing device of claim 1, wherein the processing circuitry is further operable to:
process the set of video frames to produce a processed set of video frames having a lesser frame rate than the set of video frames when the frame set backdrop is relatively higher; and
process the set of video frames to produce a processed set of video frames having an equivalent frame rate to the set of video frames when the frame set backdrop is relatively lower.

5. The processing device of claim 1, wherein the processing circuitry is further operable to:
process the set of video frames to produce a processed set of video frames having a lesser pixel resolution than the set of video frames when the frame set backdrop is relatively higher; and
process the set of video frames to produce a processed set of video frames having an equivalent pixel resolution to the set of video frames when the frame set backdrop is relatively lower.

6. The processing device of claim 1, wherein the processing circuitry is further operable to:
process the set of video frames to produce a processed set of video frames having a lesser color resolution than the set of video frames when the frame set backdrop is relatively higher; and
process the set of video frames to produce a processed set of video frames having an equivalent color resolution to the set of video frames when the frame set backdrop is relatively lower.

7. The processing device of claim 1, wherein the processing circuitry is operable to select the set of video frames from a larger set of video frames based upon content of video frames of the larger set of video frames.

8. The processing device of claim 1, wherein the frame set backdrop is determined based upon a background portion of the set of video frames.

9. The processing device of claim 1, wherein the frame set backdrop is determined based upon a foreground portion of the set of video frames.

10. The processing device of claim 1, wherein the processing circuitry is further operable to process the set of video frames to produce a processed set of video frames by altering a ratio of independent frames to predictive frames such that the set of processed frames has a differing ratio of independent frames to predictive frames than does the set of frames.

11. A method for operating on a set of video frames comprising:
receiving the set of video frames via a communication interface;
determining a frame set backdrop from the set of video frames that is a characterization of the relative difference in content of the set of video frames;
when the frame set backdrop is relatively higher indicating relatively greater content difference among the set of video frames, adjusting quality of the set of video by decreasing video quality of the set of video frames;
when the frame set backdrop is relatively lower indicating relatively lesser content difference among the set of video frames, increasing/leaving quality of the set of video frames; and
transmitting the set of video frames to a recipient device via the communication device.

12. The method of claim 11, further comprising processing the set of video frames based upon recipient device characteristics selected from the group consisting of at least:
recipient device display characteristics;
recipient device decoder characteristics;
recipient device battery life; and
recipient device processing availability.

13. The method of claim 11, further comprising:
when the frame set backdrop is relatively higher, producing a processed set of video frames having a lesser frame rate than the set of video frames; and
when the frame set backdrop is relatively lower, producing a processed set of video frames having an equivalent frame rate to the set of video frames.

14. The method of claim 11, further comprising:
when the frame set backdrop is relatively higher, producing a processed set of video frames having a lesser pixel resolution than the set of video frames; and
when the frame set backdrop is relatively lower, producing a processed set of video frames having an equivalent pixel resolution to the set of video frames.

15. The method of claim 11, further comprising:
when the frame set backdrop is relatively higher, producing a processed set of video frames having a lesser color resolution than the set of video frames; and
when the frame set backdrop is relatively lower, producing a processed set of video frames having an equivalent color resolution to the set of video frames.

16. The method of claim 11, further comprising selecting a set of video frames from the video frames by selecting the set of video frames from a larger set of video frames based upon content of video frames of the larger set of video frames.

17. The method of claim 11, wherein the frame set backdrop is determined based upon a background portion of the set of video frames.

18. The method of claim 11, wherein the frame set backdrop is determined based upon a background portion of the set of video frames.

19. The method of claim 11, wherein the frame set backdrop is selected based upon a foreground portion of the set of video frames.

20. The method of claim 11, further comprising processing the set of video frames to produce a processed set of video frames by altering a ratio of independent frames to predictive frames such that the set of processed frames has a differing ratio of independent frames to predictive frames than does the set of frames.

* * * * *